(12) United States Patent
Morger et al.

(10) Patent No.: US 6,446,150 B1
(45) Date of Patent: Sep. 3, 2002

(54) METHOD OF AND SYSTEM FOR MANAGING RESELECTION ON A SCSI BUS

(75) Inventors: Brian Lee Morger, Chatfield; Louise Ann Marier, Byron, both of MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/452,689

(22) Filed: Dec. 2, 1999

(51) Int. Cl.[7] ............................................. G06F 13/36
(52) U.S. Cl. ........................ 710/116; 710/41; 710/244
(58) Field of Search ................................ 710/107, 111, 710/114, 115, 116, 121, 122, 123, 240, 241, 244, 36, 40, 41

(56) References Cited

U.S. PATENT DOCUMENTS

| | | | |
|---|---|---|---|
| 5,367,647 A | 11/1994 | Coulson et al. | 395/325 |
| 5,613,076 A | 3/1997 | Latif et al. | 395/293 |
| 6,065,087 A | * 5/2000 | Keaveny et al. | 370/402 |

OTHER PUBLICATIONS

IBM Technical Disclosure Bulletin, SCSI Bus Fairness Through Selective Reselection, vol. 32, No. 8B, pp. 426–428.

* cited by examiner

*Primary Examiner*—Xuan M. Thai
(74) *Attorney, Agent, or Firm*—Bracewell & Patterson, LLP

(57) ABSTRACT

In a method of and a system for managing reselection of an initiator by a target on a SCSI bus, the target attempts to secure control of the bus for a first reselection cycle to reselect the initiator. If the target fails to secure control of the bus for the first reselection cycle and the target is selected by the initiator for a selection cycle, the target processes the selection cycle. However, concurrently with processing the selection cycle, substantially immediately after the bus becomes free, and before the target completes processing the selection cycle, the target attempts to secure control of the bus for a second reselection cycle to reselect the initiator.

20 Claims, 5 Drawing Sheets

METHOD OF AND SYSTEM FOR MANAGING RESELECTION ON A SCSI BUS

FIELD OF THE INVENTION

The present invention relates generally to the field of small computer system interface (SCSI)operation, and more particularly to a method of and system for managing the reselection of an initiator by a target on a SCSI bus.

DESCRIPTION OF THE PRIOR ART

In the implementation of small computer system interface (SCSI) devices, information transfer on a SCSI bus is allowed between two devices at a given time. An initiator device (typically a host adapter) originates an input/output (I/O) process and a target device (e.g., a disk drive) performs the I/O process originated by the initiator. The SCSI bus is a common resource that links the initiator and target together to complete the I/O process. The SCSI devices on the bus can be any combination of initiators and targets, provided there is at least one of each. The maximum number of SCSI devices that can be physically connected to the bus is determined by the width of the data path implemented.

Information may be transferred in a selection cycle or a reselection cycle. An initiator selection cycle is initiated by an initiator to start an I/O process between the initiator and a selected target. Occasionally, an I/O process may not be completed during a selection cycle. For example, during a write operation, the target's input data buffer may become full. In that case the target may disconnect and free up the SCSI bus for other transfers while the target is processing the information in its buffer. As another example, during a read operation, the target may need more than a particular amount of time to seek to get the information. Again, the target may disconnect, and thereby free up the bus, while it is seeking to a particular location on the disk. In any event, when the target is ready to resume the I/O process, it does so by starting a reselection cycle.

The selection and reselection cycles both proceed through phases. An arbitration phase is the mechanism that a SCSI device uses to secure control of the SCSI bus for either a selection cycle or a reselection cycle. The arbitration phase is entered from a bus free phase. Each SCSI device is assigned a SCSI ID. Typically a host adapter is assigned the highest SCSI ID. Lower priority devices are assigned lower SCSI IDs. During the arbitration phase, each device desiring to secure control of the bus asserts its SCSI ID on the bus. At the end of the arbitration phase, each device arbitrating for the bus examines the data bus to determine if its ID is highest. If a device loses the arbitration, the device releases all signals and waits for the next bus free phase.

A device that wins the arbitration continues to the next phase and controls the SCSI bus until it releases all signals to the bus free phase. When an initiator wins arbitration, it continues to a selection phase to select the target device to which it wants to send an I/O process. When a target wins arbitration, it continues to a reselection phase to reselect an initiator with an outstanding I/O process.

Tagged queuing protocol allows an initiator to send multiple I/O processes to a target and allows the target to manage each I/O process to completion. Each I/O process sent to a target takes one selection cycle. During the tagged queuing selection cycle, the target places an I/O command in its command queue and then disconnects. An initiator can continue sending I/O processes to the target until its command queue is full. When the target is ready to perform an I/O process specified by a command in its command queue, the target attempts to start a reselection cycle. Each I/O process that completes takes one or more reselection cycles.

Bus contention occurs when tagged queuing is enabled and many I/O processes are sent to a target, or when multiple initiators and targets are connected to the SCSI bus. When an initiator and target are both arbitrating to secure control of the SCSI bus, the losing device must wait until the next bus free phase before it can rearbitrate. Currently, if a particular target loses arbitration and it is the device selected by the initiator, the target must finish placing the I/O process received from the initiator in its command queue before it can re-arbitrate for reselection. It takes a substantial amount of time to queue the I/O process and start the re-arbitration process for reselection. This amount of delay decreases bus utilization and I/O throughput.

SUMMARY OF THE INVENTION

The present invention provides a method of and a system for managing reselection of an initiator by a target on a SCSI bus. According to the present invention, the target attempts to secure control of the bus for a first reselection cycle to reselect the initiator. If the target fails to secure control of the bus for the first reselection cycle and the target is selected by the initiator for a selection cycle, the target processes the selection cycle first. However, concurrently with processing the selection cycle, substantially immediately after the bus becomes free, and before the target completes processing the selection cycle, the target attempts to secure control of the bus for a second reselection cycle to reselect the initiator.

If the target secures control of the SCSI bus for the second reselection cycle, the target pauses the second reselection cycle until the target at least partially processes the selection cycle. Preferably, the target at least partially processes the selection cycle by saving interrupt status registers. After the target has at least partially processed the selection cycle, the target completes the second reselection cycle and processing of the selection cycle concurrently.

The target of the present invention includes an interface controller, a programmable sequencer, and an interface processor. The interface controller, which is physically coupled to the SCSI bus, includes a reselection state machine. The programmable sequencer is operatively connected to the interface controller. The programmable sequencer is programmed to start the reselection state machine substantially immediately after the bus becomes free if the target is selected by the initiator and a reselection start indicator is set. The interface processor is operatively connected to the programmable sequencer and the interface controller. The interface processor is programmed to set the reselection start indicator at the start of a reselection cycle to reselect the initiator.

The programmable sequencer is programmed to pause a reselection cycle if the target secures the bus and the reselection start indicator is set. The interface processor is programmed to set a go reselection indicator after it has at least partially processed the selection cycle of the initiator, if the reselection start flag is set. The programmable sequencer is programmed to complete the reselection cycle when the interface processor sets the go reselection indicator.

DESCRIPTION OF THE PREFERRED EMBODIMENT

Figure 1:
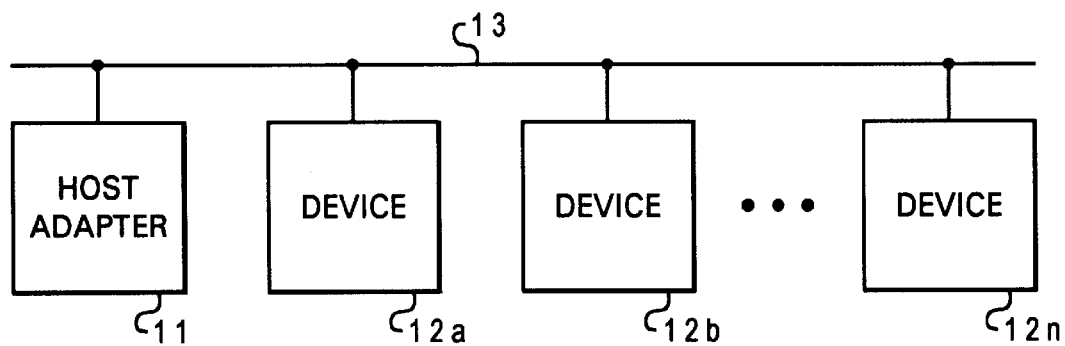
FIG. 1 is a block diagram showing a host adapter and a plurality of devices connected to a SCSI bus.

Referring now to the drawings, and first to FIG. 1, a host adapter 11 and plurality of devices 12 are connected to a SCSI bus 13. Devices 12 include I/O devices such as hard disks, tape backups, optical drives, printers and scanners.

Each device 12 may operate as an initiator or a target; however, devices 12 typically operate as targets and host adapter 11 typically operates as an initiator. An Host adapter 11 and each device 12 has its own unique SCSI ID. Host adapter 11 typically has the highest SCSI ID and devices 12 have lower SCSI IDs, depending upon their priority. Host adapter 11 and devices 12 secure control of SCSI bus during arbitration based upon their respective SCSI IDs.

Figure 2:
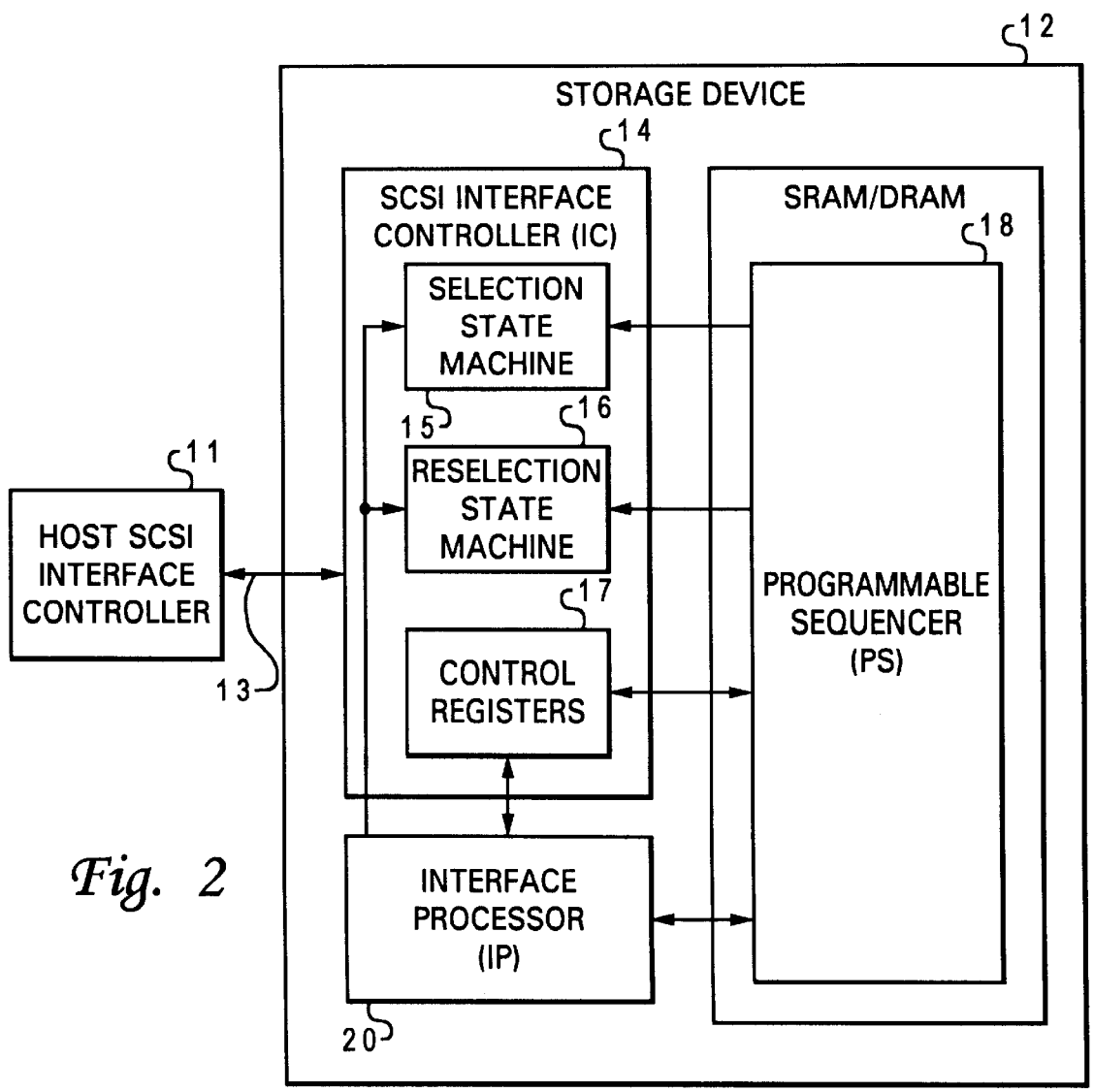
FIG. 2 is block diagram of a SCSI interface.

Referring now to FIG. 2, there is illustrated the interface components of a SCSI device, which in FIG. 2 is a storage device. Those skilled in the art will recognize that the storage device includes other components. An interface controller 14 is physically connected to SCSI bus 13. Interface controller 14 includes a selection state machine 15 and a reselection state machine 16 that control SCSI protocol during the selection and reselection cycles, respectively. Interface controller 14 also includes control registers, indicated at 17. A programmable sequencer 18 is operably connected to interface controller 14. Programmable sequencer 18 is connected to start state machines 15 and 16. Programmable sequencer 18 also has access to control registers 17. Programmable sequencer 18 is embedded in SRAM/DRAM 19 and is programmed, among other things, to monitor SCSI bus 13 for a valid selection or reselection. Programmable sequencer 18 is operatively connected to an interface processor 20. Interface processor 20 has access to control registers 17 and it enables programmable sequencer 18 to monitor when a selection or reselection cycle occurs for a given I/O process. Programmable sequencer 18 has access to both interface controller 14 and interface processor 20. Programmable sequencer 18 interrupts interface processor 20 when a selection or reselection cycle or phase completes. Programmable sequencer 18 can operate the state machines 15 and 16 of interface controller 14 based upon indicators set in control registers 17 by the microcode of interface processor 20.

Figure 3:
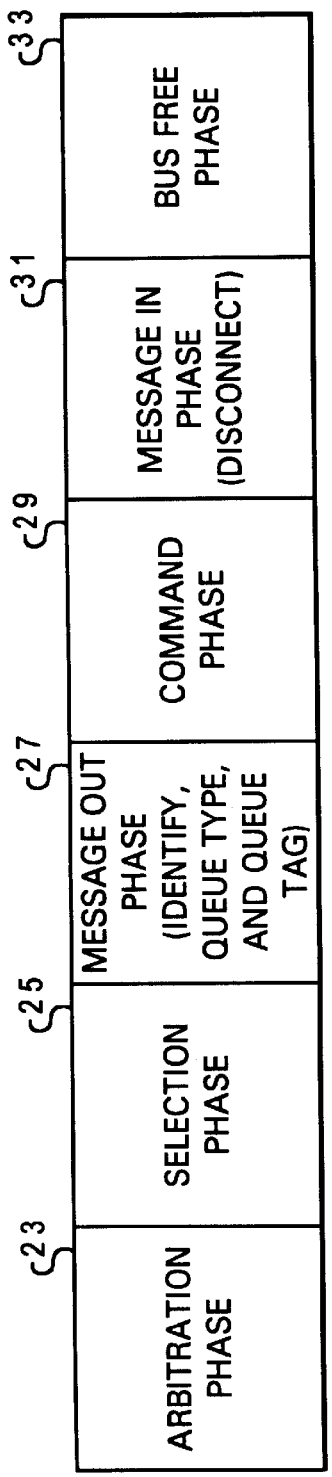
FIG. 3 illustrates the phases of a typical SCSI selection cycle.

Referring now to FIG. 3, there is illustrated a typical selection cycle according to the present invention. A selection cycle starts with an arbitration phase 23. During arbitration phase 23 each device or host adapter that desires to secure control of the bus asserts its SCSI ID on the data bus. At the conclusion of arbitration phase 23, the device with the highest ID wins and all other devices release all signals. If the winning device is an initiator, the selection cycle proceeds to a selection phase 25. If the winning device is a target, the system executes a reselection cycle, which will be discussed with respect to FIG. 4.

Referring still to FIG. 3, in selection phase 25, the initiator selects a target for the I/O process. Next, the selection cycle proceeds to a message out phase 27. According to convention, the prepositions "in" and "out" are with reference to the initiator. Thus, during message out phase 27, messages are directed from the initiator to the target. In tagged queuing according to the present invention, message or messages include identify, queue type, and queue tag, which identify a specific queued I/O process. Then, the selection cycle enters a command phase 29, in which the target requests that the command bytes be sent. After the target receives the command bytes, the selection cycle enters a message in phase 31, in which the target sends a disconnect message. After the disconnect message, the target releases the bus and the bus enters a bus free phase 33. In bus free phase 33, targets and initiators with I/O processes can enter the arbitration phase of a reselection or selection cycle, respectively.

Figure 4:
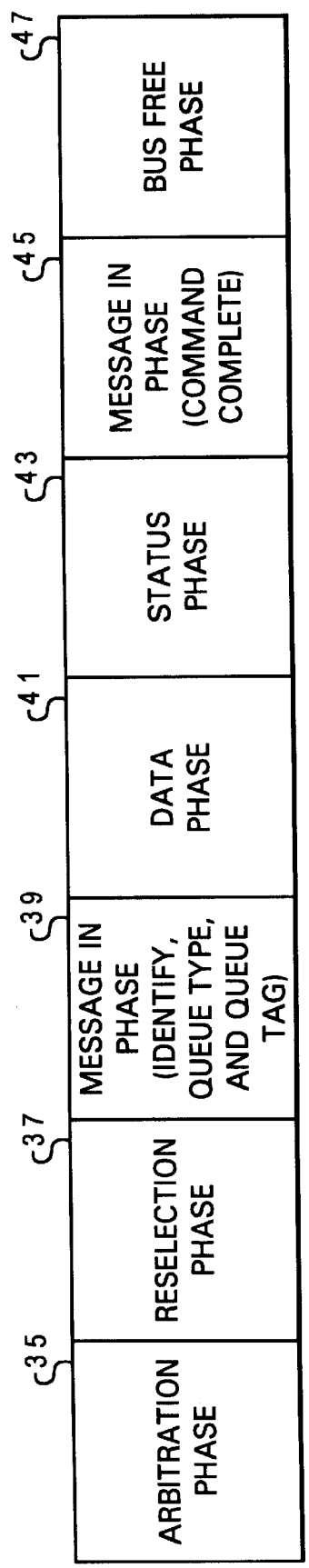
FIG. 4 illustrates the phases of a typical SCSI reselection cycle.

Referring now to FIG. 4, there is illustrated a typical reselection cycle according to the present invention. Again, a reselection cycle starts with an arbitration phase 35. If the device that wins the arbitration is a target, the system executes a reselection cycle by entering a reselection phase 37, in the target reselects an initiator for an outstanding I/O process. Next, the reselection cycle proceeds to a message in phase 39. During message in phase 39, the target directs a message or messages to the reselected initiator include identify, queue type, and queue tag, which identify a specific queued I/O process. Then, the reselection cycle enters a data phase 41, in which the I/O data is transferred between the target and the initiator. At the end of data phase 41, the reselection cycle enters a status phase 42 in which status information is exchanged between the target and the initiator. Then, the reselection cycle enters a message in phase 45, in which the target sends a command complete message. After the command complete message, the target releases the bus and the bus enters a bus free phase 47.

Figure 5:
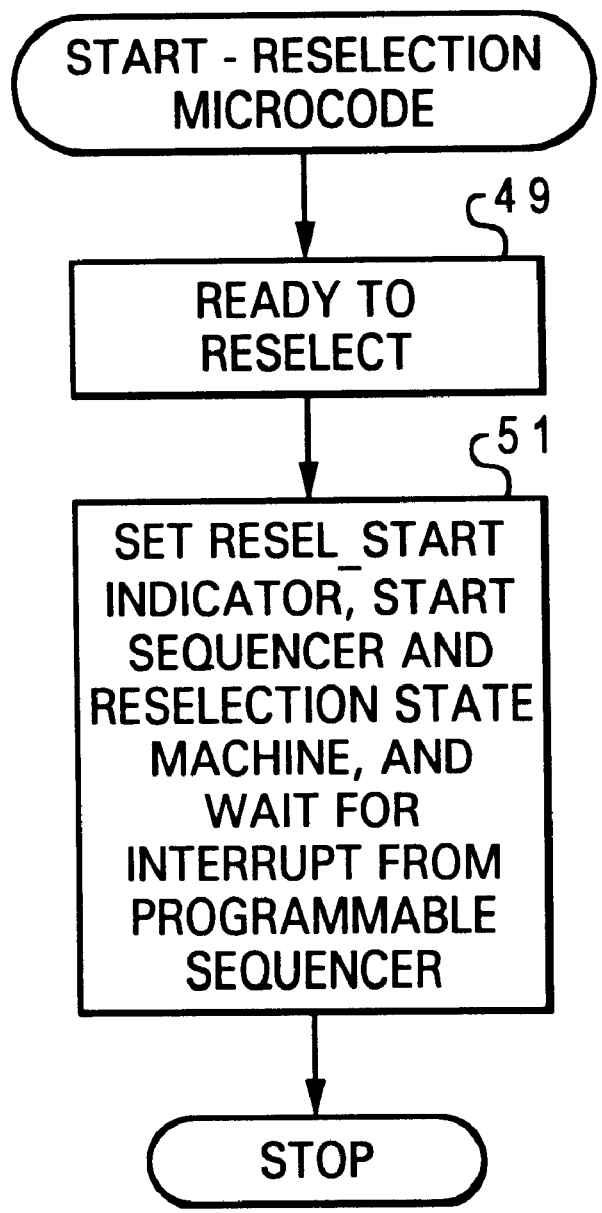
FIG. 5 is a flowchart of start reselection processing by the interface processor microcode according to the present invention.

Referring now to FIG. 5, there is shown a flowchart of interface processor microcode processing at the start of a reselection cycle. When the target is ready to reselect, as indicated at block 49, the interface processor microcode sets a RESEL_START indicator, starts the programmable sequencer and selection and reselection state machines in the interface hardware, and waits for an interrupt from the programmable sequencer, all as indicated at block 51. As will be explained in detail, the RESEL_START indicator is used by the programmable sequencer and the interface processor microcode according to the present invention.

Figure 6:
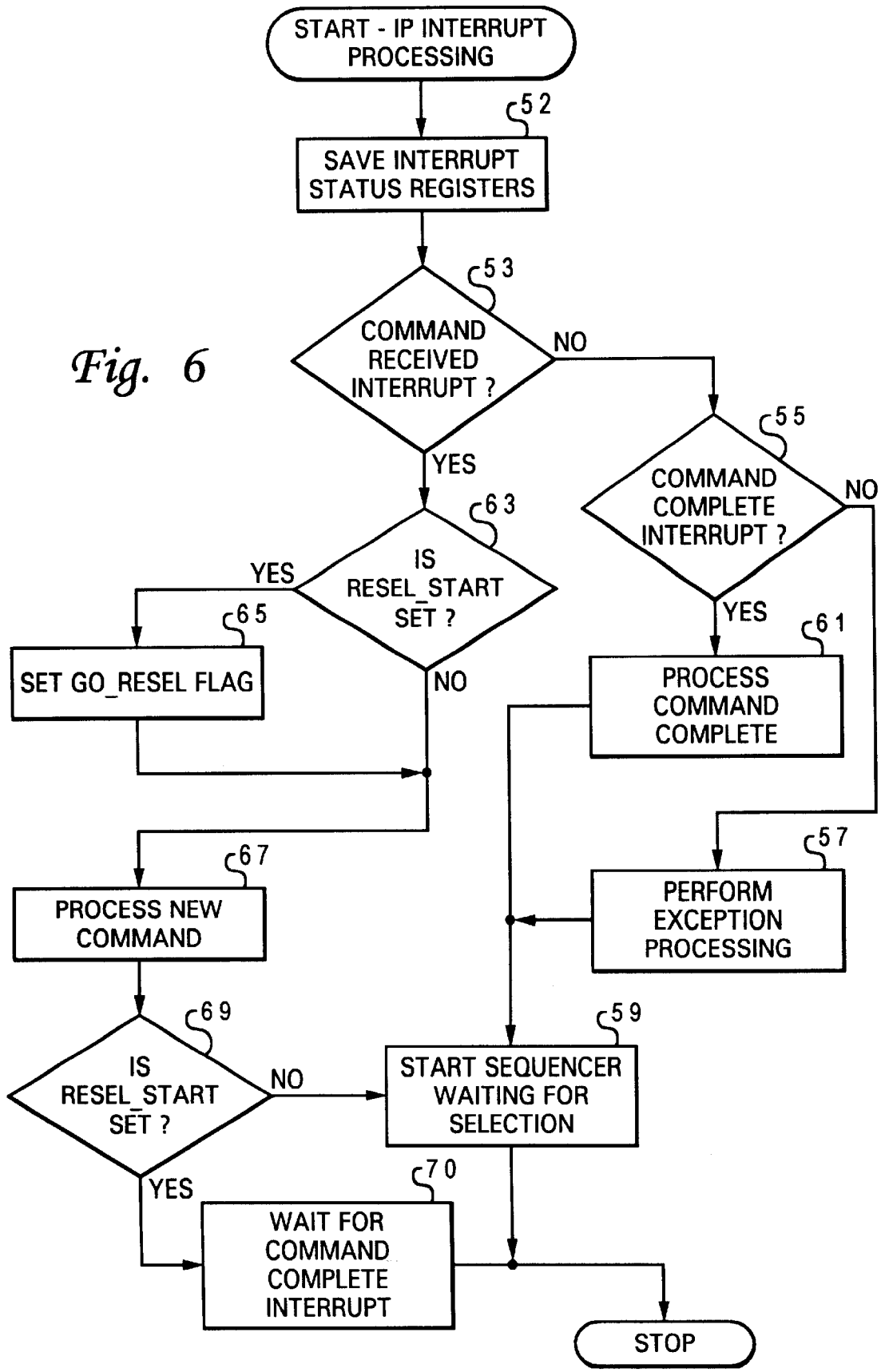
FIG. 6 is a flowchart of interface processor microcode interrupt processing according to the present invention.

Referring now to FIG. 6, there is shown a flowchart of interface processor microcode interrupt processing according to the present invention. When the interface processor receives an interrupt from the programmable sequencer, the interface processor saves the interrupt status registers, at block 52. Then the interface controller determines, at decision block 53, if the interrupt is a command received interrupt. If not, the interface processor microcode tests, at decision block 55, the interrupt is a command complete interrupt. If not, the interface processor performs exception processing, at block 57, and starts the sequencer waiting for selection, at block 59. If, at decision block 55, the interrupt is a command complete interrupt, then the interface processor processes the command complete interrupt, at block 61, processing continues at block 59.

Referring back to decision block 53, if the interrupt is a command received interrupt, the interface processor tests, at decision block 63, if the RESEL_START indicator is set. If so, the target has been selected by the initiator that it was trying to reselect and the interface processor sets a GO_RESEL indicator, at block 65. As will be explained in connection with FIG. 7, the programmable sequencer uses the GO_RESEL indicator to in connection with completing a reselection process. After setting the GO_RESEL indicator, at block 65, the interface processor processes the new command, at block 67. After processing the new command, the interface processor tests, at decision block 69, if the RESEL_START indicator is set. If so, processing ends and the interface processor waits for a command complete interrupt, block 70. If the RESEL_START indicator is not set, the interface processor starts the sequencer waiting for selection, at block 59, and FIG. 6 processing ends.

Figure 7:
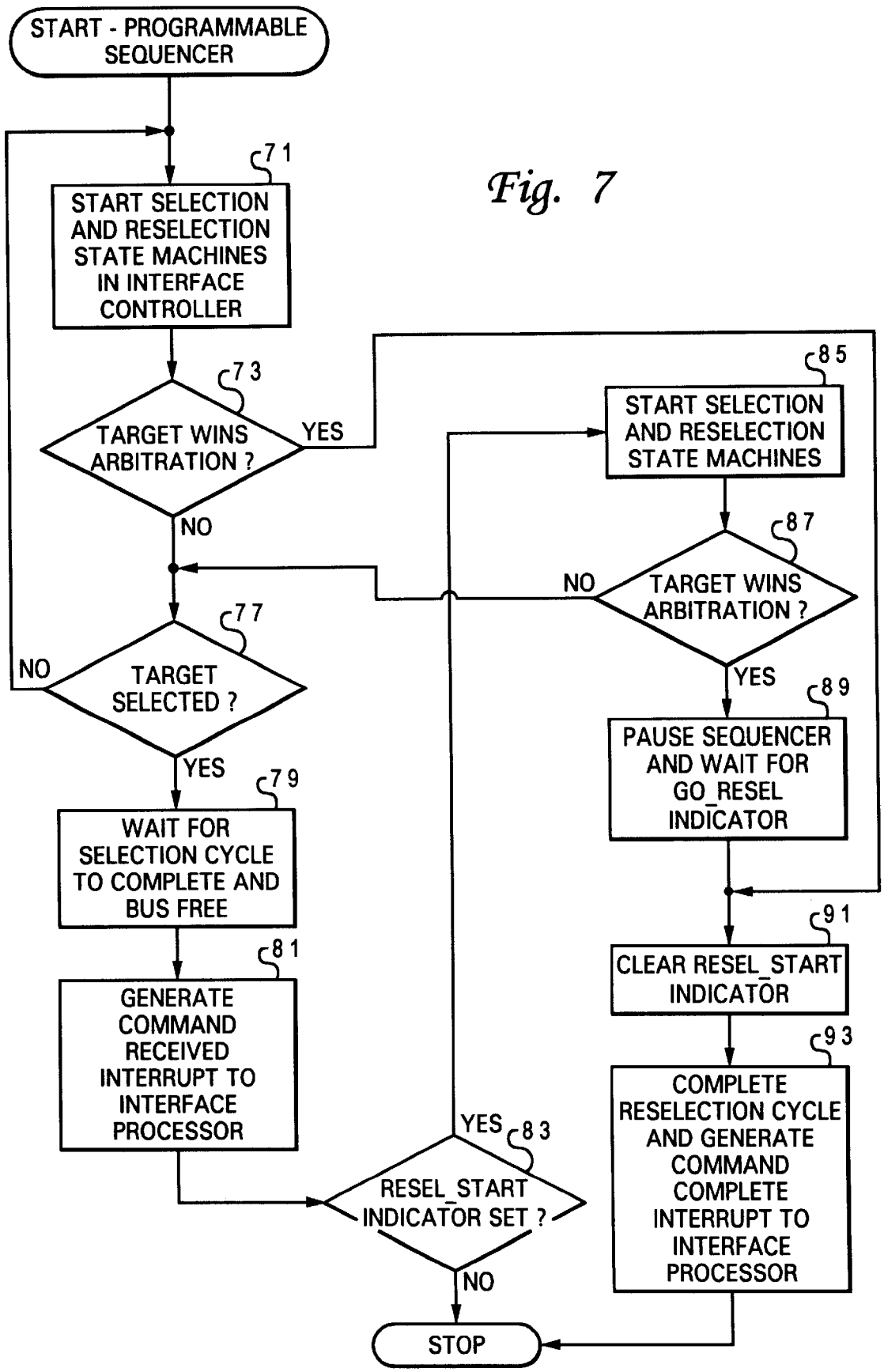
FIG. 7 is a flowchart of the programming of the programmable sequencer according to the present invention.

Referring now to FIG. 7, there is shown a flowchart of the operation of the programmable sequencer. The programmable sequencer starts the selection and reselection state machines in the interface controller, at block 71. Then the programmable sequencer tests, at decision block 73, if the target won arbitration. If so, the programmable sequencer clears the RESEL_START indicator, at block 91, completes the reselection cycle and generates a command complete interrupt, at block 93, and processing ends. If, at decision block 73, the target lost arbitration, the programmable sequencer tests, at decision block 77, if the target was selected. If not, programmable sequencer processing returns to block 71 to start the selection and reselection state machines. If the target was selected, then the programmable sequencer waits for the selection cycle to complete and the bus to become free, at block 79. When the bus becomes free, the programmable sequencer generates a command received interrupt to the interface processor, at block 81, and tests, at decision block 83, if the RESEL_START indicator is set. If not, programmable sequencer processing ends. If the RESEL_START indicator is set, then the programmable sequencer starts the selection and reselection state machines in the interface hardware, at block 85. If, at decision block 87, the target loses arbitration, the programmable sequencer returns to decision block 77. However, it the target wins arbitration, then the programmable sequencer pauses the reselection cycle and waits for the interface processor to set the GO_RESEL indicator, as indicated at block 89. Pausing the programmable sequencer allows the interface processor to save status registers as discussed with respect to FIG. 6. When the interface processor sets the GO_RESEL indicator, the programmable sequencer clears the RESEL_START indicator, at block 91. Then, the programmable sequencer completes the reselection cycle and generates a command complete interrupt to the interface processor, at block 93.

From the foregoing, it may be seen that according to the present invention, when a target attempting to reselect an initiator is selected by that initiator, the programmable sequencer and interface processor cooperate to the start a reselection cycle before the selection cycle is completely processed. The present invention, reduces substantially the amount of time for starting reselection after such a selection. The present invention greatly improves overall bus utilization during high SCSI bus activity, which results in increased system throughput.

What is claimed is:

1. A method of managing reselection of an initiator by a target on a SCSI bus, which comprises the steps of:
   starting an arbitration phase of a first reselection cycle to reselect said initiator;
   whenever said target losses said first arbitration phase of said first reselection cycle and said target is selected by said initiator:
      waiting for a selection cycle to complete and said SCSI bus to become free;
      substantially immediately after said SCSI bus has become free, starting an arbitration phase of a second reselection cycle to reselect said initiator;
      if said target wins said arbitration phase of said second reselection cycle, pausing said second reselection cycle until said target at least partially processes said selection cycle and then completing said second reselection cycle.

2. The method as claimed in claim 1, wherein said step of pausing said second reselection cycle until said target at least partially processes said selection cycle includes the steps of:
   saving interrupt register status; and
   waiting until said interrupt register status is saved before completing said second reselection cycle.

3. The method as claimed in claim 2, wherein said step of pausing said second reselection cycle until said target at least partially processes said selection cycle includes the steps of:
   setting a go reselection indicator when said interrupt status is saved; and,
   completing said second reselection cycle when said go reselection indicator is set.

4. The method as claimed in claim 1, including the step of:
   setting a reselection start indicator substantially at the start of said arbitration phase of said first reselection cycle.

5. A method of managing reselection of an initiator by a target on a SCSI bus, which comprises the steps of:
   attempting to secure control of said SCSI bus for a first reselection cycle to reselect said initiator;
   if said target fails to secure control of said SCSI bus for said first reselection cycle and said target is selected by said initiator for a selection cycle, substantially immediately after said SCSI bus becomes free at the completion of said selection cycle attempting to secure control of said bus for a second reselection cycle to reselect said initiator while said target completes processing of said selection cycle.

6. The method as claimed in claim 5, including the step of:
   if said target secures control of said SCSI bus for said second reselection cycle, pausing said second reselection cycle until said target at least partially completes processing said selection cycle.

7. The method as claimed in claim 6, including the step of:
   completing-said second reselection cycle after said target completes at least partially processing said selection cycle.

8. The method as claimed in claim 6, wherein at least partially processing said selection cycle includes the step of saving interrupt status registers.

9. A method of managing reselection of an initiator by a target on a SCSI bus, which comprises the steps of:
   attempting to secure control of said SCSI bus for a first reselection cycle to reselect said initiator;
   if said target fails to secure control of said SCSI bus for said first reselection cycle and said target is selected by said initiator for a selection cycle, processing said selection cycle; and,
   substantially immediately after said SCSI bus becomes free at the completion of said selection cycle, and before said target completes processing said selection cycle, attempting to secure control of said SCSI bus for a second reselection cycle to reselect said initiator.

10. The method as claimed in claim 9, including the step of:
    if said target secures control of said SCSI bus for said second reselection cycle, pausing said second reselection cycle until said target at least partially completes processing said selection cycle.

11. The method as claimed in claim 10, including the step of:
completing said second reselection cycle after said target at least partially completes processing said selection cycle.

12. The method as claimed in claim 10, wherein processing said selection cycle includes the step of saving interrupt status registers.

13. A target system for managing reselection of an initiator on a SCSI bus, said target system comprising:
an interface controller coupled to said SCSI bus, said interface hardware including a reselection state machine;
a programmable sequencer operatively connected to said interface controller, said programmable sequencer being programmed to start said reselection state machine substantially immediately after said SCSI bus becomes free if said target is selected by said initiator and a reselection start indicator is set;
an interface processor operatively connected to said programmable sequencer, said interface processor being programmed to set said reselection start indicator at the start of a reselection cycle to reselect-said initiator.

14. The target system as claimed in claim 13, wherein said interface processor is programmed to process a selection cycle when said target is selected by said initiator.

15. The target system as claimed in claim 14, wherein said interface processor is programmed to set a go reselection indicator when said interface processor completes processing said selection cycle.

16. The target system as claimed in claim 15, wherein said programmable sequencer is programmed to pause a reselection cycle if said target wins an arbitration phase after said target is selected by said initiator and said reselection start indicator is set.

17. The target system as claimed in claim 16, wherein said programmable sequencer is programmed to complete said reselection cycle when said interface processor sets said go reselection start indicator.

18. The target system as claimed in claim 13, wherein said wherein said programmable sequencer is programmed to generate a command received interrupt at the completion of a selection cycle in which said target is selected.

19. The target system as claimed in claim 18, interface processor is programmed to save interrupt status registers in response to said command received interrupt and set a go reselection indicator is said reselect start indicator is set.

20. The target system as claimed in claim 19, wherein said programmable sequencer is programmed to pause a reselection cycle, if said target wins an arbitration phase after said target is selected by said initiator and said reselection start indicator is set, until said go reselection indicator is set.

* * * * *